United States Patent [19]

Bogan et al.

[11] Patent Number: 4,701,481

[45] Date of Patent: Oct. 20, 1987

[54] DURABLE EPOXY RESIN

[75] Inventors: Gary W. Bogan, Lake Jackson, Tex.; Peter A. Lucas, Allentown, Pa.; Georgia A. Monnerat, Lake Jackson, Tex.

[73] Assignee: The Dow Chemical Company, Midland, Mich.

[21] Appl. No.: 924,963

[22] Filed: Oct. 30, 1986

Related U.S. Application Data

[63] Continuation-in-part of Ser. No. 769,043, Aug. 26, 1985, abandoned.

[51] Int. Cl.$^4$ .......................... C08L 63/00; C08K 3/36
[52] U.S. Cl. ..................... 523/428; 523/435; 523/466; 525/482; 525/524; 525/527; 428/413; 428/414
[58] Field of Search ............ 523/428, 466, 435; 525/482, 524, 527

[56] References Cited

U.S. PATENT DOCUMENTS

| | | | |
|---|---|---|---|
| 3,536,734 | 10/1970 | Vegter et al. | 549/517 |
| 3,823,200 | 7/1974 | De Pradenne et al. | 523/466 |
| 3,948,855 | 4/1976 | Perry | 528/89 |
| 4,043,969 | 8/1977 | Sporck | 523/466 |
| 4,390,680 | 6/1983 | Nelson | 528/97 |
| 4,394,497 | 7/1983 | Nelson et al. | 528/101 |

OTHER PUBLICATIONS

"Electronics-Related Materials Entered the Second Stage/Dipp Epoxy, Orginally Developed Material, Reached the Goal", article published Mar. 23, 1985 in The Kagaku Kogyo Daily, (The Chemical Industrial Daily News), Japan.

Primary Examiner—Lewis T. Jacobs
Assistant Examiner—Ralph H. Dean, Jr.
Attorney, Agent, or Firm—James G. Carter

[57] ABSTRACT

Curable compositions are prepared from reinforced epoxy resin compositions comprising (A) a filler material such as silica flour, (B) one or more epoxy resins at least one of which is a hydrocarbon novolac epoxy resin such as a phenol-dicyclopentadiene epoxy novolac resin and (C) one or more epoxy resin curing agents such as phenol-formaldehyde novolac resin. These compositions are particularly suitable for use in electrical applications such as the encapsulation and subsequent protection of electrical and micro-electronic devices and circuitry and in adhesive formulations.

19 Claims, No Drawings 4,701,481

DURABLE EPOXY RESIN

CROSS REFERENCE TO RELATED APPLICATION

This application is a continuation-in-part of application Ser. No. 769,043 filed Aug. 26, 1985, now abandoned.

BACKGROUND OF THE INVENTION

Curable compositions which are particularly suitable as encapsulating or adhesive compositions have previously been prepared from epoxy resins such as phenol-aldehyde epoxy resins, cresol-aldehyde epoxy resins, bisphenol A epoxy resins, and the like. However, while these resins result in encapsulating compositions suitable for use in encapsulating electrical and electronic components and which are suitable in adhesive compositions, it would be desirable if such compositions had an improvement in one or more of the following: moisture resistance to prevent circuitry corrosion, resistance to thermal shock, stable electrical properties at elevated temperatures, lap shear strength and the like.

It has now been discovered that the present invention provides an improvement in one or more of the following: moisture resistance; chemical resistance; thermal cycling characteristics and resistance to thermal shock; elevated temperature electrical properties; shrinkage characteristics; retention of physical, thermal, and electrical properties after moisture exposure; lap shear strength at elevated temperatures and milder exotherms during the curing process.

SUMMARY OF THE INVENTION

The present invention pertains to an improvement in curable compositions comprising
(A) at least one filler material;
(B) at least one epoxy resin; and
(C) at least one curing agent for component (B);
wherein the improvement resides in employing as at least a part of component (B) at least one hydrocarbon epoxy novolac resin in an amount such that at least about 40, preferably from about 90 to about 100 percent of the epoxy groups present in component (B) are contributed by said hydrocarbon epoxy novolac resin.

The present invention also pertains to electrical or electronic components encapsulated with the aforementioned curable compositions.

Another aspect of the present invention pertains to one or more substrates bonded together with the aforementioned compositions.

DETAILED DESCRIPTION OF THE INVENTION

Suitable hydrocarbon epoxy novolac resins which can be employed herein include those disclosed by Vegter et al in U.S. Pat. No. 3,536,734, by Nelson in U.S. Pat. No. 4,390,680 and Nelson et al in U.S. Pat. No. 4,394,497 all of which are incorporated herein by reference. Particularly suitable hydrocarbon epoxy novolac resins include those prepared by dehydrohalogenating the reaction product of an epihalohydrin and the reaction product of an aromatic hydroxyl-containing compound with an unsaturated hydrocarbon having from about 4 to about 55 carbon atoms.

Suitable aromatic hydroxyl-containing compounds which can be employed herein include any such compounds which contain one or two aromatic rings, at least one phenolic hydroxyl group and at least one ortho or para ring position with respect to a hydroxyl group available for alkylation.

Particularly suitable aromatic hydroxylcontaining compounds which can be employed herein include, for example, phenol, chlorophenol, bromophenol, dimethylphenol, methylphenol, hydroquinone, catechol, resorcinol, guaiacol, pyrogallol, phloroglucinol, isopropylphenol, ethylphenol, propylphenol, t-butylphenol, isobutylphenol, octylphenol, nonylphenol, cumylphenol, p-phenylphenol, o-phenylphenol, m-phenylphenol, bisphenol A, dihydroxydiphenyl sulfone, mixtures thereof and the like.

Suitable unsaturated hydrocarbons which, either in a crude or purified state, can be employed herein include, for example, butadiene, isoprene, piperylene, cyclopentadiene, cyclopentene, 2-methylbutene-2, cyclohexene, cyclohexadiene, methyl cyclopentadiene, dicyclopentadiene, limonene, dipentene, linear and cyclic dimers of piperylene, methyl dicyclopentadiene, dimethyl dicyclopentadiene, norbornene, norbornadiene, ethylidine norbornene, mixtures thereof and the like. Also suitable unsaturated hydrocarbons include the other dimers, codimers, oligomers and cooligomers of the aforementioned unsaturated hydrocarbons. Particularly suitable unsaturated hydrocarbons which can be employed herein include, for example, a dicyclopentadiene concentrate containing from about 70 to about 100 percent by weight of dicyclopentadiene; from about 0 to about 30 percent by weight of $C_9$–$C_{12}$ dimers or codimers of $C_4$–$C_6$ dienes such as, for example, cyclopentadiene-isoprene, cyclopentadienepiperylene, cyclopentadienemethyl cyclopentadiene, and/or dimers of isoprene, piperylene, methyl cyclopentadiene and the like; from about zero to about 7 percent by weight of $C_{14}$–$C_{18}$ trimers of $C_4$–$C_6$ dienes and from about zero to about 10 percent by weight of aliphatic diolefins such as, for example, piperylene, isoprene, 1,5-hexadiene and cyclic olefins such as cyclopentadiene, methyl cyclopentadiene, cyclopentene and the like. Methods of preparation for these dicyclopentadiene concentrates and more detailed descriptions thereof can be found collectively in U.S. Pat. No. 3,557,239 issued to Gebhart et al and U.S. Pat. No. 4,167,542 issued to Nelson, both of which are incorporated herein by reference.

Also, particularly suitable unsaturated hydrocarbons which can be employed herein include a crude dicyclopentadiene stream containing from about 20 to about 70 percent by weight dicyclopentadiene, from about 1 to about 10 percent codimers and dimers of $C_4$–$C_6$ hydrocarbons (described above), from about zero to about 10 percent oligomers of $C_4$–$C_6$ dienes and the balance to provide 100 percent, $C_4$–$C_6$ alkanes, alkenes and dienes.

Also, particularly suitable unsaturated hydrocarbons which can be employed herein include a crude piperylene or isoprene stream containing from about 30 to about 70 percent by weight piperylene or isoprene, about zero to about ten percent by weight $C_9$–$C_{12}$ and codimers of $C_4$–$C_6$ dienes, and the balance to provide 100% by weight $C_4$–$C_6$ alkanes, alkenes and dienes.

Also, particularly suitable unsaturated hydrocarbon which can be employed herein include a composition comprising from about 95% to about 100% by weight of dicyclopentadiene and the balance, if any, to provide 100% by weight of $C_4$–$C_7$ saturated or unsaturated hydrocarbons or oligomers thereof.

Also, particularly suitable are hydrocarbon oligomers prepared by polymerization of the reactive components in the above hydrocarbon streams e.g., dicyclopentadiene concentrate, crude dicyclopentadiene, crude piperylene or isoprene, individually or in combination with one another or in combination with high purity diene streams.

These hydrocarbon epoxy novolac resins can be employed alone or in admixture with other epoxy resins such as the diglycidyl ethers of dihydric phenols such as, for example, resorcinol, catechol, hydroquinone, bisphenol A, bisphenol F, dihydroxybiphenyl, mixtures so thereof and the like. Also suitable are the polyglycidyl ethers of phenolic materials having more than two hydroxyl groups such as, for example tris(hydroxyphenyl)methane, tetra(hydroxyphenyl)ethane, phenol-aldehyde novolacs, mixtures thereof and the like. Also, suitable are the halogenated derivatives, particularly the brominated derivatives of the aforementioned epoxy resins.

Suitable curing agents which can be employed herein include, for example, amines, acids or anhydrides thereof, biguanides, imidazoles, urea-aldehyde resins, melamine-aldehyde resins, phenolics, halogenated phenolics, combinations thereof and the like. These and other curing agents are disclosed in Lee and Neville's Handbook of Epoxy Resins, McGraw-Hill Book Co., 1967 which is incorporated herein by reference. Particularly suitable curing agents include, for example, dicyandiamide, methylenedianiline, diaminodiphenylsulfone, 2-methylimidazole, diethylenetoluenediamine, bisphenol A, tetrabromobisphenol A, phenol-formaldehyde novolac resins, halogenated phenol-formaldehyde resins, the maleic anhydride adduct of methylcyclopentadiene (Nadic methyl anhydride), combinations thereof and the like.

Suitable filler materials which can be employed herein for use in encapsulating formulations include, for example, finely divided silica flour, quartz, calcium silicate, barium sulfate, hydrated alumina combination thereof and the like. Filler selection will have varying effects on moisture permeation through the molded or encapsulated piece since they make up between 50 and 75 percent by weight of the complete composition.

Suitable filler materials which can be employed for such use in adhesive formulations include, for example, the aforementioned filler materials as well as colloidal or fumed silica, powdered metals such as, for example, aluminum, copper, iron and the like, synthetic rubber materials such as, for example, carboxyl terminated, butadiene acrylonitrile rubbers mixtures thereof and the like.

Suitable catalysts or promoters or accelerators which can be employed include, for example, tertiary amines, imidazoles, phosphonium compounds, ammonium compounds, sulfonium compounds, phosphines, mixtures thereof and the like.

Suitable tertiary amines include, for example, triethylenediamine, N-methylmorpholine, triethylamine, tributylamine, benzyldimethylamine, tris(dimethylaminomethyl)phenol, mixtures thereof and the like.

Suitable imidazoles include, for example, 2-methylimidazole, 1-propylimidazole, mixtures thereof and the like.

Suitable phosphonium compounds include, for example, those disclosed by Dante et al in U.S. Pat. No. 3,477,990, Perry in Canadian Patent No. 893,191 and U.S. Pat. No. 3,948,855 and by Tyler, Jr. et al in U.S. Pat. No. 4,366,295 all of which are incorporated herein by reference.

Suitable quaternary ammonium compounds include, for example, benzyl trimethyl ammonium chloride, benzyl trimethyl ammonium hydroxide, tetrabutyl ammonium chloride, tetrabutyl ammonium hydroxide, mixtures thereof.

Suitable phosphines include, for example, triphenyl phosphine.

If desired, mold release agents can be employed in the encapsulating compositions of the present invention. Suitable such mold release agents include, for example, stearates such as glycerol monostearate, calcium stearate or waxes such as montan wax or carnauba, combinations thereof and the like.

The encapsulating compositions of the present invention are suitable for use in encapsulating electrical and electronic devices and the like. They are particularly suitable for use in encapsulation of micro circuitry typically found in discrete device and integrated circuits.

The adhesive compositions of the present invention are suitable for use in adhesives used at elevated temperatures such as, for example aircraft, opto-electronic devices, and various uses in the aerospace industry and the like.

Suitable substrate materials which can be bonded together with the adhesive compositions of the present invention include, for example, aluminum, copper, steel, glass, rubber, wood, thermoplastics, and thermoset plastic materials such as cured epoxy resins, cured polyester resins, cured vinyl ester resins, combinations thereof and the like.

If desired, the compositions of the present invention can also contain fire retardant additives, coupling agents and other additives as desired.

The following examples are illustrative of the invention, but are not to be construed as to limiting the scope thereof in any manner.

Epoxy Resin A is the glycidyl ether of the reaction product of phenol and a dicyclopentadiene concentrate consisting of about 83% DCPD, 1.4% non-reactive light hydrocarbons, and the remainder being primarily a mixture of codimers of $C_4$–$C_6$ dienes. This resin has an average functionality of about 3.2 and an epoxide equivalent weight, EEW, of 279.

Epoxy Resin B was a cresol-formaldehyde epoxy novolac resin having an average functionality of 4–6 and an epoxide equivalent weight, EEW, of 219.

Epoxy Resin C was a diglycidyl ether of tetrabromobisphenol A having an average EEW of 450 and a bromine content of ~48 percent by weight.

Epoxy Resin D was the polyglycidyl ether of a 3.6 functional phenol-formaldehyde novolac resin. The epoxy resin had an EEW of 179.

Epoxy Resin E was the diglycidyl ether of bisphenol A having an EEW of 187.

Phenolic Resin A was a phenol-aldehyde novolac resin having an average functionality of 3–5 and a hydroxyl equivalent weight of 104 commercially available from Schenectady Chemicals, Inc., as HRJ 2190.

Accelerator A was 2-methylimidazole.

Mold Release Agent A was montan wax.

EXAMPLE 1

The transfer molding compositions were prepared from the indicated formulation in the following manner.

The transfer molding compositions were prepared from the indicated formulations on a two roll mill. One roll was operated at a temperature of 200° C. to 210° C. while the other roll was operated at a temperature of 250° C. The resin, silica flour and suitable mold release agent were thoroughly mixed to insure proper filler wetting. A brominated resin was then added in an amount to achieve approximately 1–2% bromine content by weight of the final formulation. Next a phenolic functional resin was added. When the mixture became homogeneous, an accelerator was added and mixed for no more than about two minutes (120 s). The accelerator was added as a 10% by weight mixture in the phenolic resin. At the end of the two minute (120 s) period, the formulation was removed from the mill and the thin sheet allowed to cool to ambient temperature (25° C.). A portion of the formulation was then ground into a powder and aged at 40° C. to simulate storage conditions. About 20–25 g of each formulation was used to generate spiral flow information on the initial sample. Press platens were at approximately 350° F. (176.7° C.). The cycle times were 2.5 minutes (150 s). The pressure on the transfer ram was 1000 psi (6894.8 kPa). These same press conditions were employed to obtain circular discs 2 inches (50.8 mm) in diameter and ⅛ inch (3.175 mm) thick. The discs were subjected to a 4 hour (14.400 s) postback at 350° F. (176.7° C.). The electrical properties were obtained according to the procedure of ASTM D-150 and ASTM D-257. Portions of the post-cured discs were cut out to run glass transition temperatures via thermomechanical analysis. After six days at 40° C. the aged samples were molded in the spiral flow mold and the amount of flow compared to the results of the unaged samples. The results are given in the following Table I.

TABLE I

| | FORMULATION | |
|---|---|---|
| | A | B* |
| COMPOSITION | | |
| Resin, Type/pbw | A/100 | B/100 |
| | C/22.8 | C/22.8 |
| Silica Flour, pbw | 368 | 389 |
| Mold Release Agent, type/pbw | A/3 | A/3 |
| Phenolic Resin, Type/pbw | A/42.4 | A/52.5 |
| Accelerator, Type/pbw | A/.5 | A/.5 |
| PROPERTIES | | |
| Tg (TMA) | 177 | 186 |
| % Spiral Flow Retention After 6 days @ 40° C. | 90 | 93 |
| Dissipation Factor @ $10^3$ cps | | |
| 21° C. | 0.004 | 0.005 |
| 150° C. | 0.022 | 0.030 |
| Dielectric Constant @ $10^3$ cps | | |
| 21° C. | 3.99 | 4.2 |
| 150° C. | 4.07 | 4.36 |
| Volume Resistivity @ 500 V | | |
| 21° C. | $1 \times 10^{16}$ | $1 \times 10^{16}$ |
| 150° C. | $3.35 \times 10^{11}$ | $1.45 \times 10^{11}$ |

*Not an example of the present invention.

Samples of the cured molding compositions were also tested for moisture resistance by placing them in an autoclave operated at a temperature of 250° F. (121.1° C.) and 15 psig (103.4 kPa) steam for 500 hours (1,800,000 s).

The results are given in the following Table II.

TABLE II

| MOISTURE RESISTANCE | | |
|---|---|---|
| Exposure Time | % Weight Gain | |
| hours/seconds | Formulation A | Formulation B* |
| 25/90,000 | 0.41 | 0.59 |
| 50/180,000 | 0.48 | 0.69 |
| 75/270,000 | 0.51 | 0.75 |
| 100/360,000 | 0.53 | 0.78 |
| 200/720,000 | 0.58 | 0.85 |
| 300/1,080,000 | 0.59 | 0.89 |
| 400/1,440,000 | 0.60 | 0.91 |
| 500/1,800,000 | 0.62 | 0.91 |

*Not an example of the present invention.

EXAMPLE 2

Adhesive formulations were prepared by blending the components in the ratios given in Table III. In each instance, all the components were weighed into a container, heated to melt the resin, and blended until homogeneous. The level of the dicyandiamide hardener employed was that level which had been determined in previous studies to provide the maximum lap shear strength values for that particular resin. Lap shear testing was then performed on each formulation according to the procedure set forth in ASTM D-1002 except that alloy 6061-T6 aluminum panels were employed instead of the alloy 2024-T3 recommended in ASTM D-1002. The surfaces of the aluminum panels were prepared according to the procedure of ASTM D-2651. The lap shear test specimens were cured for 1 hour (3,600 s) at 185° C. prior to testing. The formulations and test results are given in Table III.

TABLE III

| | FORMULATION | | |
|---|---|---|---|
| | A | B* | C* |
| COMPOSITION | | | |
| Epoxy Resin, type | A | D | E |
| , g | 30.9 | 31.3 | 20.0 |
| Dicyandiamide, g | 2.8 | 2.2 | 1.3 |
| Aluminum powder[1], g | 15.4 | 15.6 | 10.0 |
| Colloidal silica[2], g | 0.9 | 0.9 | 0.6 |
| LAP SHEAR STRENGTH | | | |
| Temperature, °F. (°C.) | 70 | 70 | 70 |
| | (21.1) | (21.1) | (21.1) |
| , psi | 2167 | 1920 | 2793 |
| , kPa | 14941 | 13238 | 19257 |
| Temperature, °F. (°C.) | 200 | 200 | 200 |
| | (93.3) | (93.3) | (93.3) |
| , psi | 2737 | 1530 | 2805 |
| , kPa | 18871 | 10549 | 19339 |
| Temperature, °F. (°C.) | 300 | 300 | 300 |
| | (148.9) | (148.9) | (148.9) |
| , psi | 2640 | 1195 | 1380 |
| , kPa | 18202 | 8239 | 9514 |
| Temperature, °F. (°C.) | 350 | 350 | 350 |
| | (176.7) | (176.7) | (176.7) |
| , psi | 2143 | 925 | 507 |
| , kPa | 14775 | 6377 | 3495 |
| Temperature, °F. (°C.) | 400 | 400 | 400 |
| | (204.4) | (204.4) | (204.4) |
| , psi | 940 | 700 | 267 |
| , kPa | 6481 | 4926 | 1841 |
| Temperature, °F. (°C.) | 450 | 450 | 450 |
| | (232.2) | (232.2) | (232.2) |
| , psi | 420 | 355 | — |
| , kPa | 2896 | 2447 | — |
| Temperature, °F. (°C.) | 500 | 500 | 500 |
| | (260) | (260) | (260) |
| , psi | 265 | 310 | — |
| , kPa | 1827 | 2137 | — |

*Not an example of the present invention.
[1]The aluminum powder was Alcoa grade M-101.
[2]The colloidal silica was Cab-O-Sil from Cabot Corp.

EXAMPLE 3

Adhesive formulations were prepared by blending the components in the ratios given in Table IV. In each instance, all the components were weighed into a container, heated to melt the resin, and blended until homogeneous. The level of the diaminodiphenyl sulfone hardener employed was that level which had been determined in previous studies to provide the maximum lap shear strength values for that particular resin. Lap shear testing was then performed on each formulation according to the procedure set forth in ASTM D-1002 except that alloy 6061-T6 aluminum panels were employed instead of the allow 2024-T3 recommended in ASTM D-1002. The surfaces of the aluminum panels were prepared according to the procedure of ASTM D-2651. The lap shear test specimens for formulations A & B were cured for 1 hour (3,600 s) at 160° C. followed by 2 hours (7,200 s) at 218° C. The lap shear test specimens for formulation C was cured for 1 hour at 177° C. prior to testing. The formulations and test results are given in Table IV.

TABLE IV

| | FORMULATION | | |
|---|---|---|---|
| | A | B* | C* |
| COMPOSITION | | | |
| Epoxy Resin, type | A | D | F[3] |
| , g | 20.0 | 20.0 | |
| Diaminodiphenyl sulfone, g | 4.4 | 6.9 | |
| Aluminum powder[1], g | 10.0 | 10.0 | |
| Colloidal silica[2], g | 0.6 | 0.6 | |
| SHEAR STRENGTH | | | |
| Temperature, °F. (°C.) | 72 (22.2) | 72 (22.2) | 72 (22.2) |
| , psi | 1900 | 2550 | 3200 |
| , kPa | 13100 | 17581 | 22063 |
| Temperature, °F. (°C.) | 250 (121.1) | 250 (121.1) | 250 (121.1) |
| , psi | 3400 | 2800 | — |
| , kPa | 23442 | 19305 | — |
| Temperature, °F. (°C.) | 350 (176.7) | 350 (176.7) | 350 (176.7) |
| , psi | 3150 | 2450 | 2425 |
| , kPa | 21718 | 16892 | 16719 |
| Temperature, °F. (°C.) | 400 (204.4) | 400 (204.4) | 400 (204.4) |
| , psi | 2750 | 2100 | 1900 |
| , kPa | 18960 | 14478 | 13100 |
| Temperature, °F. (°C.) | 450 (232.2) | 450 (232.2) | 450 (232.2) |
| , psi | 1375 | 1625 | 1750 |
| , kPa | 9480 | 11204 | 12066 |

*Not an example of the present invention.
[1]The aluminum powder was Reynolds grade 120.
[2]The colloidal silica was Cab-O-Sil from Cabot Corp.
[3]A proprietary adhesive formulation from the Hysol Division of The Dexter Corporation.

We claim:
1. In a curable composition comprising
   (A) at least one filler material;
   (B) at least one epoxy resin; and
   (C) at least one curing agent for component (B); the improvement which comprises employing as at least a part of component (B) at least one hydrocarbon epoxy novolac resin, halogenated epoxy hydrocarbon novolac resin or combination thereof in an amount such that at least about 40 percent of the epoxy groups present in component (B) are contributed by said hydrocarbon epoxy novolac resins.
2. A curable composition of claim 1 wherein
   (i) component (A) is silica flour;
   (ii) component (B) is the product resulting from dehydrohalogenating the reaction product of an epihalohydrin and (1) one or more hydrocarbon novolac resins, (2) one or more halogenated hydrocarbon novolac resins, (3) a combination of (1) and (2) or (4) a combination of (a) one or more hydrocarbon novolac resins or one or more halogenated hydrocarbon novolac resins or a combination thereof and (b) one or more phenol-aldehyde novolac resins, one or more halogenated phenol-aldehyde novolac resins, one or more bisphenol A based resins, one or more halogenated bisphenol A based resins or any combination thereof;
   (iii) component (C) is a phenolic material or a carboxylic acid anhydride or mixture thereof; and
   (iv) said hydrocarbon epoxy novolac resin or halogenated hydrocarbon epoxy novolac resin is present in an amount such that from about 90 to about 100 percent of the epoxy groups present in component (B) are contributed by said hydrocarbon epoxy novolac resin or combination thereof.
3. A curable composition of claim 2 wherein component (B) contains the product resulting from dehydrohalogenating the reaction product of an epihalohydrin and the product resulting from reacting phenol, cresol or a combination thereof with (a) an unsaturated hydrocarbon containing an average of from 6 to about 55 carbon atoms per molecule or halogenated derivatives of such reaction products, or mixture of such hydrocarbons or halogenated derivatives thereof; (b) oligomers and/or cooligomers of hydrocarbon dienes or halogenated hydrocarbon dienes, which dienes have from 4 to about 24 carbon atoms or mixture of such hydrocarbon dienes or halogenated hydrocarbon dienes or (c) a combination of (a) and (b).
4. A curable composition of claim 2 wherein component (B) contains
   (i) the product resulting from dehydrohalogenating the reaction product of epichlorohydrin and the product resulting from reacting phenol, cresol or a combination thereof with a composition comprising from about 70 to about 100 percent by weight of dicyclopentadiene, from about zero to about 30 percent by weight of $C_{10}$ dimers, from about zero to about 7 percent by weight of oligomers of $C_4$–$C_6$ unsaturated hydrocarbons and the balance if any to provide 100% by weight of $C_4$–$C_6$ alkanes, alkenes or dienes;
   (ii) halogenated derivatives of the product of component (i); or
   (iii) combinations thereof.
5. A curable composition of claim 2 wherein component (B) contains
   (i) the product resulting from dehydrohalogenating the reaction product of epichlorohydrin and the product resulting from reacting phenol, cresol or a combination thereof with a composition comprising from about 95% to about 100% by weight of dicyclopentadiene and the balance, if any, to provide 100% by weight of $C_4$ to $C_7$ saturated or unsaturated hydrocarbons or oligomers thereof;
   (ii) halogenated derivatives of the product of component (i); or
   (iii) combinations thereof.
6. A curable composition of claim 1 wherein
   (i) component (A) is fumed or colloidal silica, metal powder, synthetic rubber material or a combination thereof;
   (ii) component (B) is the product resulting from dehydrohalogenating the reaction product of an epihalohydrin and (1) one or more hydrocarbon novolac resins, (2) one or more halogenated hydrocarbon novolac resins, (3) a combination of (1) and (2) or (4) a combination of (a) one or more hydrocarbon novolac resins or one or more halogenated hydrocarbon novolac resins or a combination thereof and (b) one or more phenol-aldehyde novolac resins, one or more bisphenol A based resins, one or more halogenated bisphenol A based resins or any combination thereof;

(iii) component (C) is dicyandiamide, diaminodiphenyl sulfone, methylenedianiline or a combination thereof; and (iv) said hydrocarbon epoxy novolac resin or halogenated hydrocarbon epoxy novolac resin is present in an amount such that from about 90 to about 100 percent of the epoxy groups present in component (B) are contributed by said hydrocarbon epoxy novolac resin or halogenated hydrocarbon epoxy novolac resin or combination thereof.

7. A curable composition of claim 6 wherein component B contains the product resulting from dehydrohalogenating the reaction product of an epihalohydrin and the product resulting from reacting phenol, cresol, or a combination thereof with (a) an unsaturated hydrocarbon containing an average of from 6 to about 55 carbon atoms per molecule or halogenated derivatives of such reaction products, or mixture of such hydrocarbon or halogenated derivatives thereof; (b) oligomers and/or co-oligomers of hydrocarbon dienes or halogenated hydrocarbon dienes which dienes have from 4 to about 24 carbon atoms or mixture of such hydrocarbon dienes or halogenated hydrocarbon dienes or (c) a combination of (a) and (b).

8. A curable composition of claim 6 wherein component (B) contains (i) the product resulting from dehydrohalogenating the reaction product of epichlorohydrin and the product resulting from reacting phenol, cresol or a combination thereof with a composition comprising from about 70 to about 100 percent by weight of dicyclopentadiene, from about zero to about 30 percent by weight of $C_{10}$ dimers, from about zero to about 7 percent by weight of oligomers of $C_4$–$C_6$ unsaturated hydrocarbons and the balance, if any, to provide 100% by weight of $C_4$–$C_6$ alkanes, alkenes or dienes;

(ii) halogenated derivatives of the product of component (i); or (iii) combinations thereof.

9. A curable composition of claim 6 wherein component (B) contains (i) the product resulting from dehydrohalogenating the reaction product of epichlorohydrin and the product resulting from reacting phenol, cresol or a combination thereof with a composition comprising from about 95 percent to about 100% by weight of dicyclopentadiene and the balance, if any, to provide 100% by weight of $C_4$ to $C_7$ saturated or unsaturated hydrocarbons or oligomers thereof;

(ii) halogenated derivatives of the product of component (i); or (iii) combinations thereof.

10. An electrical or electronic component encapsulated with a composition of claim 1.

11. An electrical or electronic component encapsulated with a composition of claim 2.

12. An electrical or electronic component encapsulated with a composition of claim 3.

13. An electrical or electronic component encapsulated with a composition of claim 4.

14. An electrical or electronic component encapsulated with a composition of claim 5.

15. One or more substrates bonded together with a composition of claim 1.

16. One or more substrates bonded together with a composition of claim 6.

17. One or more substrates bonded together with a composition of claim 7.

18. One or more substrates bonded together with a composition of claim 8.

19. One or more substrates bonded together with a composition of claim 9.

* * * * *